(12) United States Patent
Hikida

(10) Patent No.: US 9,064,179 B2
(45) Date of Patent: Jun. 23, 2015

(54) REGION EXTRACTION APPARATUS, REGION EXTRACTION METHOD, AND COMPUTER PROGRAM PRODUCT

(71) Applicant: Satoshi Hikida, Kanagawa (JP)

(72) Inventor: Satoshi Hikida, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/073,988

(22) Filed: Nov. 7, 2013

(65) Prior Publication Data

US 2014/0133761 A1 May 15, 2014

(30) Foreign Application Priority Data

Nov. 15, 2012 (JP) ................. 2012-251338
Jul. 31, 2013 (JP) ................. 2013-159834

(51) Int. Cl.
  *G06K 9/46* (2006.01)
  *G06T 7/00* (2006.01)
(52) U.S. Cl.
  CPC ............ *G06K 9/4604* (2013.01); *G06T 7/0081* (2013.01); *G06T 2207/20148* (2013.01)
(58) Field of Classification Search
  USPC .......................................... 382/181, 199, 208
  See application file for complete search history.

(56) References Cited

U.S. PATENT DOCUMENTS

| 5,604,823 | A | * | 2/1997 | Ono ............................... 382/199 |
| 7,333,672 | B2 | * | 2/2008 | Chatting et al. ............... 382/266 |
| 2009/0196522 | A1 | | 8/2009 | Hikida |
| 2009/0238462 | A1 | * | 9/2009 | Feris et al. .................... 382/190 |
| 2010/0027906 | A1 | | 2/2010 | Hara et al. |
| 2011/0293191 | A1 | * | 12/2011 | Shin et al. ..................... 382/199 |
| 2011/0298964 | A1 | | 12/2011 | Hikida |
| 2012/0206490 | A1 | | 8/2012 | Hikida |
| 2013/0063468 | A1 | | 3/2013 | Hikida |

FOREIGN PATENT DOCUMENTS

| JP | 2011-002965 | 1/2011 |
| JP | 2013-196308 | 9/2013 |

OTHER PUBLICATIONS

Bertalmio, M. et al. "Navier-Stokes, Fluid Dynamics, and Image and Video Inpainting," Proceedings of the International Conference on Computer Vision and Pattern Recognition, IEEE, Dec. 2001, Kauai, HI, vol. I.
Telea, A. "An Image Inpainting Technique Based on the Fast Marching Method," Journal of Graphics Tools, vol. 9, No. 1, pp. 25-36, 2004.

* cited by examiner

*Primary Examiner* — Edward Park
(74) *Attorney, Agent, or Firm* — Harness, Dickey & Pierce, P.L.C.

(57) ABSTRACT

A region extraction apparatus includes: a region extraction unit that extracts, from an image data of a process target, a high intensity region having higher intensity than a neighboring region thereof and a low intensity region having lower intensity than a neighboring region thereof; a combination identification unit that identifies a combination of a high intensity region and a low intensity region corresponding to an extraction target region to be extracted based on arrangement positions of the high intensity region and the low intensity region extracted by the region extraction unit; an outer frame determination unit that determines an outer frame corresponding to the combination of the high intensity region and the low intensity region; and a contour extraction unit that extracts a contour of the extraction target region based on image data within the outer frame determined by the outer frame determination unit.

4 Claims, 15 Drawing Sheets

REGION EXTRACTION APPARATUS, REGION EXTRACTION METHOD, AND COMPUTER PROGRAM PRODUCT

CROSS-REFERENCE TO RELATED APPLICATIONS

The present application claims priority to and incorporates by reference the entire contents of Japanese Patent Application No. 2012-251338 filed in Japan on Nov. 15, 2012 and Japanese Patent Application No. 2013-159834 filed in Japan on Jul. 31, 2013.

BACKGROUND OF THE INVENTION

1. Field of the Invention

The present invention relates to a region extraction apparatus, a region extraction method, and a computer program product.

2. Description of the Related Art

Conventionally, in production printing, a technology (printing with high-speed copiers for the commercial printing market and the office printing market) has been known in which printing data is created to apply a special effect to a printed image by changing its glossiness with clear toner (transparent toner) or by using a spot color such as a metal or fluorescent color.

Furthermore, a method in which a user specifies a few regions to which the user desires to apply a special effect, and a system automatically extracts a region similar to the specified regions by a similar region search using a local feature value, and automatically extracts the contours of the region by a contour extraction process (graph cuts or the like) is already known as a method for identifying a region to which a special effect is to be applied.

Furthermore, Japanese Patent Application Laid-open No. 2011-002965 discloses, for the purpose of realizing a highly accurate image search without depending on a change in the background of an object, a method for specifying a contour line that separates an object of a query image from a background, extracting a plurality of local feature values of the query image, searching a database with a local feature value of an object region only, acquiring a plurality of candidate images, subsequently calculating an element feature value of each sub-region of the query image, recalculating an element feature value of each sub-region including its contour line using an element feature value of a neighboring sub-region of the sub-region for the query image, comparing, only for the object region, the recalculated element feature values of the sub-regions of the query image with element features values registered in the database of the candidate images, further calculating the similarity of the candidate images to the query image, and selecting and outputting the image with high similarity as a search result.

However, the technology in which a few regions to which a special effect is applied are specified and a similar region search or the like is performed as described above, and the technology of Japanese Patent Application Laid-open No. 2011-002965 detect only a few feature points in, for example, an image such as an image of a water droplet on a leaf where automatic extraction is hard, and therefore cannot obtain a sufficient number of similar regions. Moreover, there is a problem that if a threshold value is lowered to increase the number of detections, the number of noise detections increases, and a problem that not the contour of the droplet but a highlight portion is falsely detected, or the like occurs.

In view of the above, there is a need to provide a region extraction apparatus, a region extraction method, and a computer program product that can accurately extract a predetermined region in an image.

SUMMARY OF THE INVENTION

It is an object of the present invention to at least partially solve the problems in the conventional technology.

A region extraction apparatus extracts a predetermined region from image data. The region extraction apparatus includes: a region extraction unit that performs thresholding on intensity values of pixels of image data of a process target, and extracts, from the image data, a high intensity region having higher intensity than a neighboring region thereof and a low intensity region having lower intensity than a neighboring region thereof; a combination identification unit that identifies a combination of a high intensity region and a low intensity region corresponding to an extraction target region to be extracted based on arrangement positions of the high intensity region and the low intensity region extracted by the region extraction unit; an outer frame determination unit that determines an arrangement position and size of an outer frame corresponding to the combination of the high intensity region and the low intensity region based on the arrangement positions and sizes of the high intensity region and the low intensity region of the combination identified by the combination identification unit; and a contour extraction unit that extracts a contour of the extraction target region based on image data within the outer frame determined by the outer frame determination unit.

A region extraction method of extracting a predetermined region from image data, includes: a region extraction step of performing thresholding on intensity values of pixels of image data of a process target, and extracting, from the image data, a high intensity region having higher intensity than a neighboring region thereof and a low intensity region having lower intensity than a neighboring region thereof; a combination identification step of identifying a combination of a high intensity region and a low intensity region corresponding to an extraction target region to be extracted based on arrangement positions of the high intensity region and low intensity region extracted in the region extraction step; an outer frame determination step of determining an arrangement position and size of an outer frame corresponding to the combination of the high intensity region and the low intensity region based on the arrangement positions and sizes of the high intensity region and the low intensity region of the combination identified in the combination identification step; and a contour extraction step of extracting a contour of the extraction target region based on image data within the outer frame determined in the outer frame determination step.

A computer program product includes a non-transitory computer-usable medium having computer-readable program codes embodied in the medium. The program codes when executed cause a computer to function as: a region extraction unit that performs thresholding on intensity values of pixels of image data of a process target, and extracts, from the image data, a high intensity region having higher intensity than a neighboring region thereof and a low intensity region having lower intensity than a neighboring region thereof; a combination identification unit that identifies a combination of a high intensity region and a low intensity region corresponding to an extraction target region to be extracted based on arrangement positions of the high intensity region and low intensity region extracted by the region extraction unit; an outer frame determination unit that determines an arrangement position and size of an outer frame corresponding to the combination of the high and the low intensity region based on the arrangement positions and sizes of the high intensity region and the low intensity region of the combination identified by the combination identification unit; and a contour extraction unit that extracts a contour of the extraction target region based on image data within the outer frame determined by the outer frame determination unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a region extraction apparatus, a region extraction method, and a program will be described in detail with reference to the accompanying drawings.

Figure 1:
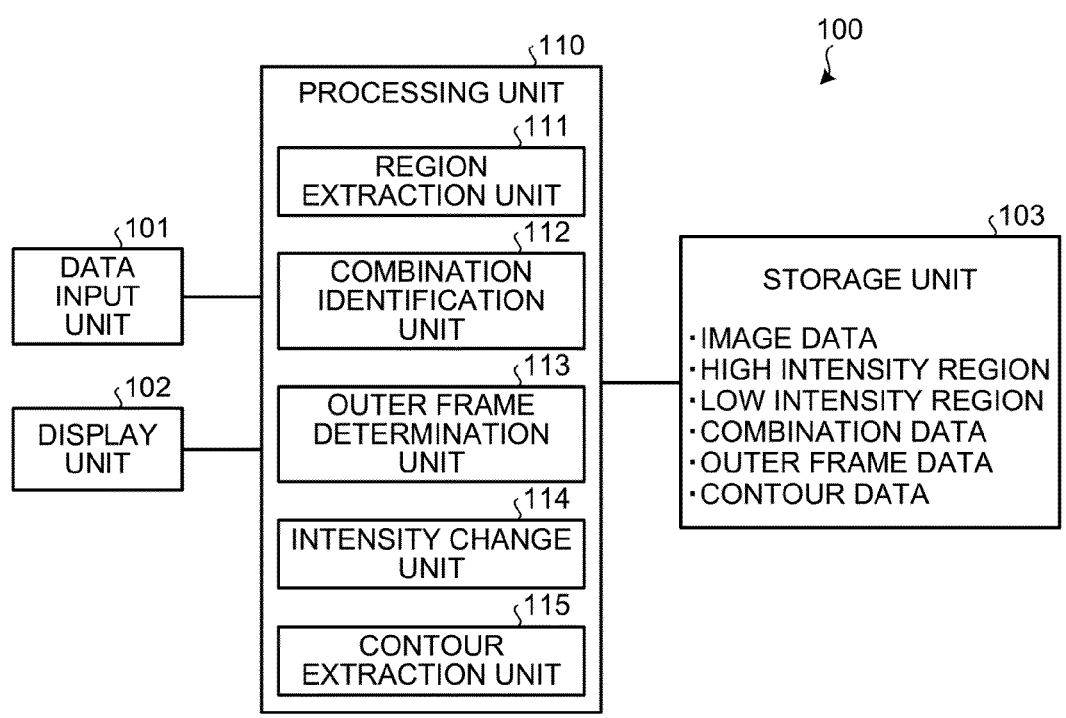
FIG. 1 is a block diagram illustrating a configuration of an image processing apparatus.

FIG. 1 is a block diagram illustrating a configuration of an image processing apparatus 100 including the region extraction apparatus according to the embodiment. The image processing apparatus 100 extracts a predetermined region from image data being a process target.

The image processing apparatus 100 includes a data input unit 101, a display unit 102, a storage unit 103, and a processing unit 110. Image data being a process target is input via the data input unit 101, and stored in the storage unit 103. The display unit 102 displays the image data, a region extraction result, and the like. The storage unit 103 stores various pieces of information. The storage unit 103 stores, for example, as information used by the processing unit 110, information such as data representing a high intensity region and a low intensity region in the image data, combination data representing a combination of a high intensity region and a low intensity region, outer frame data representing an outer frame of a combination, and contour data representing the contour of an extraction target region.

The processing unit 110 includes a region extraction unit 111, a combination identification unit 112, an outer frame determination unit 113, an intensity change unit 114, and a contour extraction unit 115.

The region extraction unit 111 acquires the image data of the process target. The region extraction unit 111 then extracts a high intensity region and a low intensity region by thresholding in which the intensity value of each pixel of the image data of the process target is compared with a predetermined value.

Figure 2A:
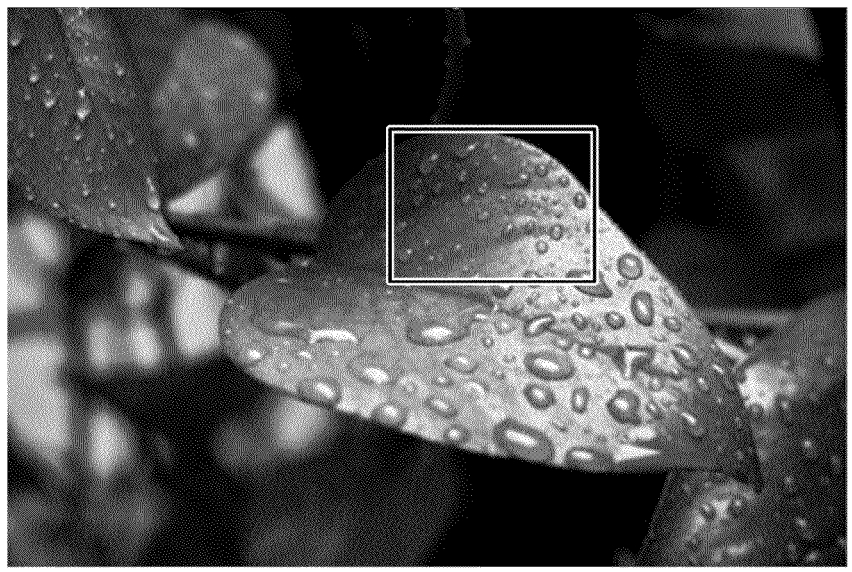
FIG. 2A is a diagram illustrating an image including water droplets on a leaf.
Figure 2B:
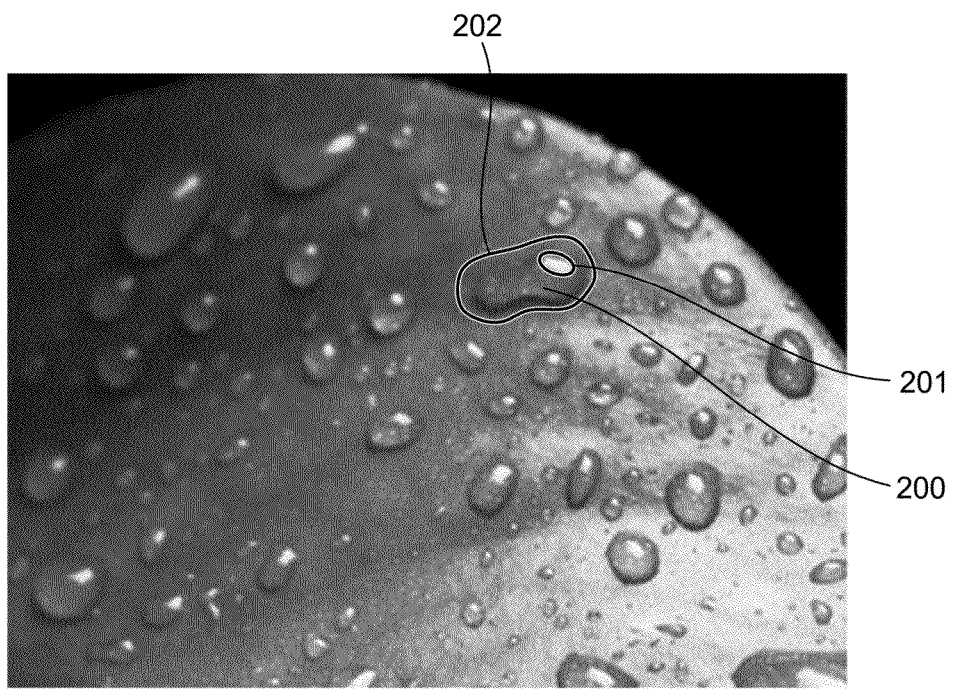
FIG. 2B is a diagram illustrating an enlarged droplet portion of the image illustrated in FIG. 2B.

The high intensity region and the low intensity region will be described here. FIGS. 2A and 2B are diagrams illustrating examples of image data being a process target of the image processing apparatus 100. FIG. 2A is an image including water droplets on a leaf. FIG. 2B is an image where a water droplet portion being an extraction target in the image illustrated in FIG. 2A is enlarged. Hereinafter, a description will be given, as appropriate, taking an example of a case where the image processing apparatus 100 sets the water droplet portion illustrated in FIG. 2B as the extraction target.

Similarly to a water droplet 200 illustrated in FIG. 2B, a part of a captured image of a reflective object with a surface having high curvature becomes a highlight portion 201, and exhibits higher intensity than the other regions of the water droplet 200. On the other hand, a shadow portion 202 of the water droplet 200 exhibits intensity that is lower than the region of the water droplet 200 and also lower than a background image. The image processing apparatus 100 of the embodiment extracts a water droplet portion being an extraction target region by using a feature that a highlight portion has high intensity and a shadow portion has low intensity when an image of a reflective object with a surface having high curvature is targeted for extraction as aforementioned.

In order to extract the highlight portion 201 and the shadow portion 202 that are used when the extraction target region is extracted, the region extraction unit 111 extracts a high intensity region and a low intensity region that correspond to the highlight portion 201 and the shadow portion 202.

Specifically, the region extraction unit 111 compares each pixel intensity value with a plurality of threshold values, and makes comprehensive determination on the comparison result by taking into consideration an amount of change in a boundary position between the high and low intensity regions with respect to change in the threshold value, for example, and accordingly does not uniformly perform binarization with one threshold value but performs local thresholding. Consequently, the high and low intensity regions can be extracted based on the intensity value of each extraction target region irrespective of the intensity value of the background also in the image having the background with intensity increasing toward the right, as illustrated in FIG. 2B. In other words, the high intensity region is a high intensity region having higher intensity than a neighboring region in the vicinity of the region, and the low intensity region is a lower intensity region having lower intensity than a neighboring region in the vicinity of the region.

The combination identification unit 112 identifies a combination of one high intensity region and one low intensity region based on the arrangement positions of the high and low intensity regions extracted by the region extraction unit 111. There exists a plurality of both the high and low intensity regions extracted by the region extraction unit 111. The combination identification unit 112 identifies a combination of a high intensity region and a low intensity region that correspond to a highlight portion and a shadow portion of one extraction target region based on the positional relationship between these.

The outer frame determination unit 113 determines the position and size of an outer frame of a region including the extraction target region based on the respective arrangement positions and sizes of the high intensity region and the low intensity region of the combination identified by the combination identification unit 112. The outer frame determination unit 113 determines the position and size of the outer frame by providing a margin so that the background outside the extraction target region is included in the outer frame.

The intensity change unit 114 changes the intensity of the high intensity region in the image data within the outer frame determined by the outer frame determination unit 113 to the intensity value of a neighboring region of the high intensity region. Here, the neighboring region is a region adjacent to the high intensity region and is a region where a change in intensity value is equal to or less than a certain value. In other words, the neighboring region is a region that does not include a portion where an intensity change is large such as an edge portion and exhibits uniform intensity.

The contour extraction unit 115 extracts the contour of the extraction target region based on the image data within the outer frame after the intensity value change. The contour extraction unit 115 extracts the contour, for example, by a graph cut algorithm. The graph cut algorithm is a method that defines region segmentation as an energy minimization problem, solves the maximum flow problem of a graph structure, and accordingly performs the region segmentation. For the graph cut algorithm, refer to C. Rother, V. Kolmogorv, A. Blake, ""GrabCut": Interactive Foreground Extraction Using Iterated Graph Cuts," AC M Trans. Graphics (SIGGRAPH '04), vol. 23, no. 3, pp. 309-314, 2004.

Figure 3:
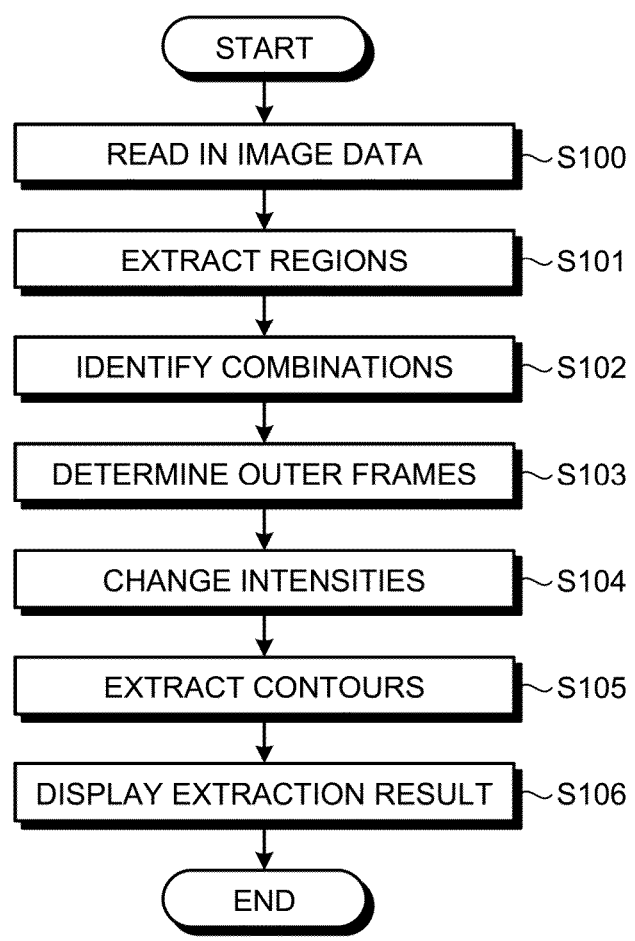
FIG. 3 is a flowchart illustrating a process of the image processing apparatus.

FIG. 3 is a flowchart illustrating a process of the image processing apparatus 100. A description will be given here taking, as an example, a process of extracting an image area of the water droplet from the image data including the water droplets on the leaf, the image data being illustrated in FIG. 2B. The data input unit 101 of the image processing apparatus 100 reads the image data first, and stores the image data in the storage unit 103 (step S100). The image data is displayed on the display unit 102.

Next, the region extraction unit 111 of the processing unit 110 extracts high intensity regions and low intensity regions from the image data, and stores the data in the storage unit 103 (step S101). The region extraction process of step S101 will be described here in detail.

Figure 4:
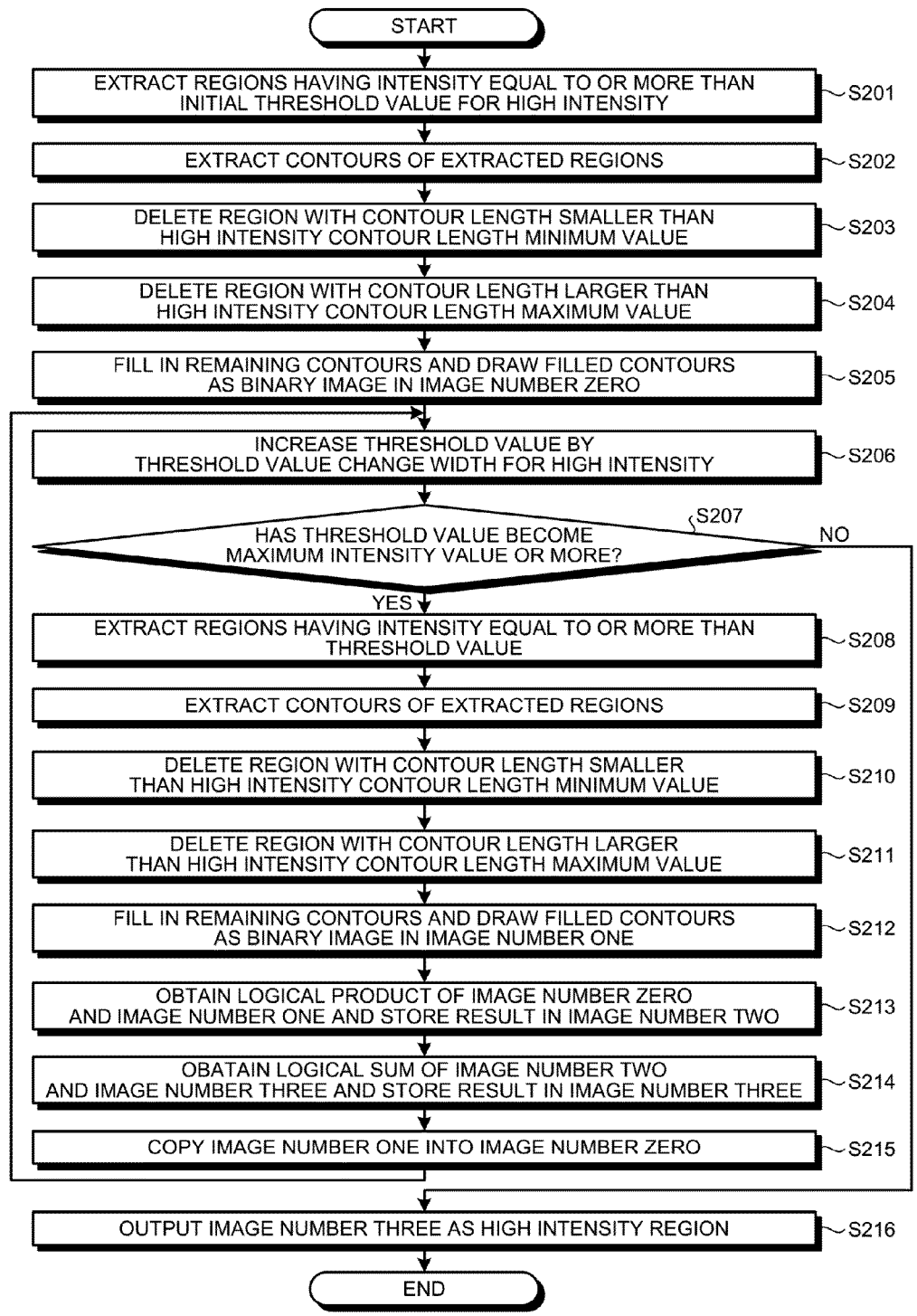
FIG. 4 is a flowchart illustrating a procedure of a high intensity region extraction process.

Firstly, the high intensity region extraction will be described. FIG. 4 is a flowchart illustrating a procedure of the high intensity region extraction process. It is assumed here that an initial threshold value for high intensity, a high intensity contour length minimum value, a high intensity contour maximum value, and a threshold value change width for high intensity are previously input and set by a user.

Firstly, the region extraction unit 111 extracts regions with intensity equal to or more than the initial threshold value for high intensity from the image data (step S201). The region extraction unit 111 then extracts the contours of the extracted regions (step S202). Next, the region extraction unit 111 deletes a region with contour length smaller than the high intensity contour length minimum value (step S203), and further deletes a region with contour length larger than the contour length maximum value for high intensity (step S204). The region extraction unit 111 then fills in the contours of the resulting remaining regions and draws the regions as a binary image in an image number zero being a predetermined region on a RAM (step S205).

Next, the region extraction unit 111 increases the threshold value by the threshold value change width for high intensity (step S206). The region extraction unit 111 then judges whether or not the threshold value has become a maximum intensity value or more (step S207).

If the threshold value has become the maximum intensity value or more (step S207: Yes), then the region extraction unit 111 extracts regions where intensity is equal to or more than the threshold value from the image data (step S208), and extracts the contours of the extracted regions (step S209).

Next, the region extraction unit 111 deletes a region with contour length smaller than the high intensity contour length minimum value (step S210), and further deletes a region with contour length larger than the contour length maximum value for high intensity (step S211). The region extraction unit 111 then fills in the contours of the resulting remaining regions and draws the regions as a binary image in an image number one being a predetermined region on the RAM (step S212).

Next, the region extraction unit 111 obtains the logical product of the images of the image number zero and the image number one, and stores the resulting logical product in an image number two being a predetermined region on the RAM (step S213). Next, the region extraction unit 111 obtains the logical product of the image of the image number two and an image of an image number three being a predetermined region on the RAM, and stores the resulting logical product in the image number three (step S214). The region extraction unit 111 then copies the image of the image number one into the image number zero (step S215). Then, the process returns to step S206 to and the process up to step S215 is repeated.

In step S207, if the threshold value has not become the maximum intensity value or more (step S207: No), the process proceeds to step S216. The region extraction unit 111 extracts the image of the image number three as high intensity regions (step S216), and ends the process. Consequently, the high intensity regions are extracted from the image data.

Figure 5:
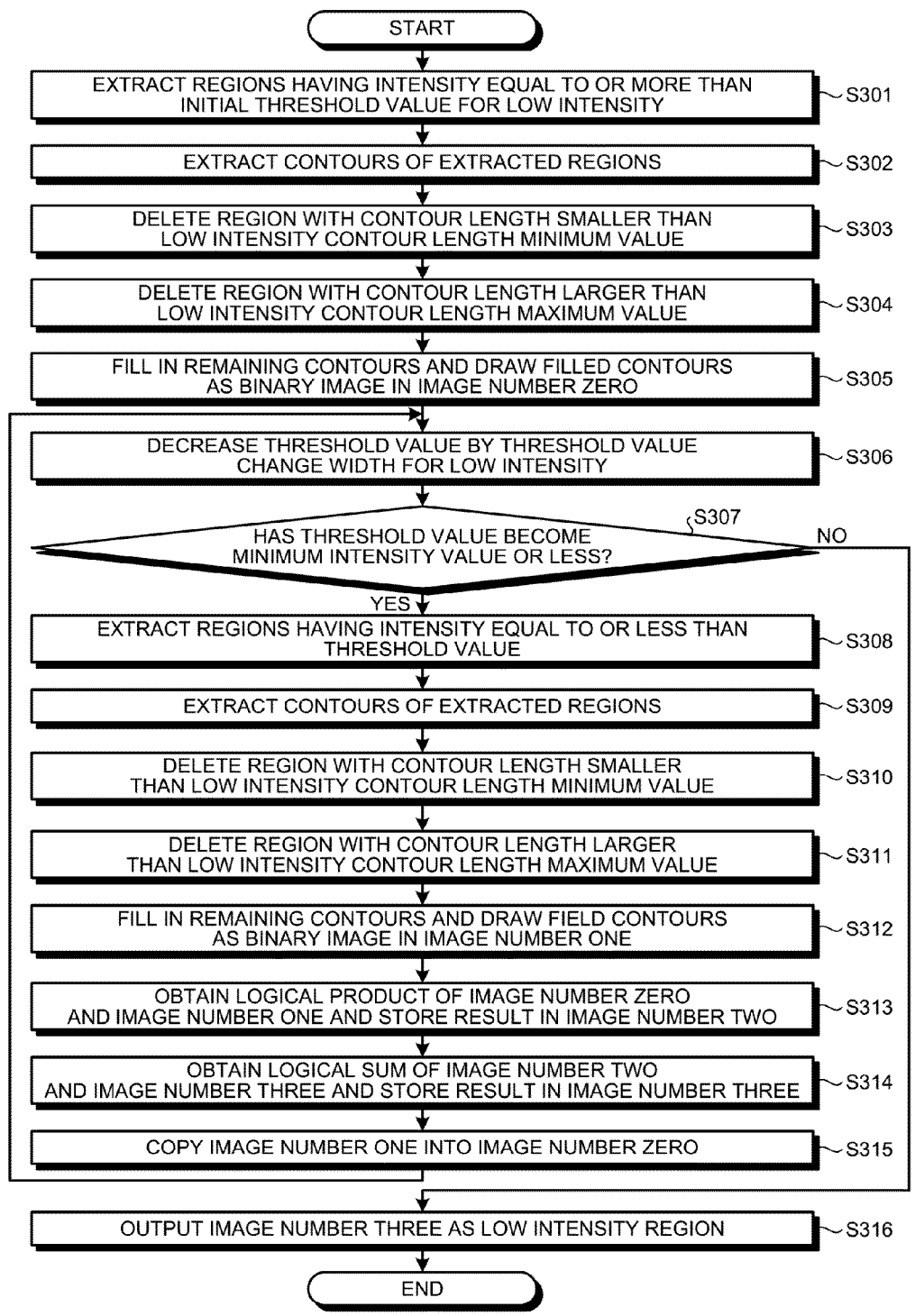
FIG. 5 is a flowchart illustrating a procedure of a low intensity region extraction process.

Firstly, the low intensity region extraction will be described. FIG. 5 is a flowchart illustrating a procedure of the low intensity region extraction process. It is assumed here that an initial threshold value for low intensity, a low intensity contour length minimum value, a low intensity contour length maximum value, and a threshold value change width for low intensity are previously input and set by the user.

Figure 6:
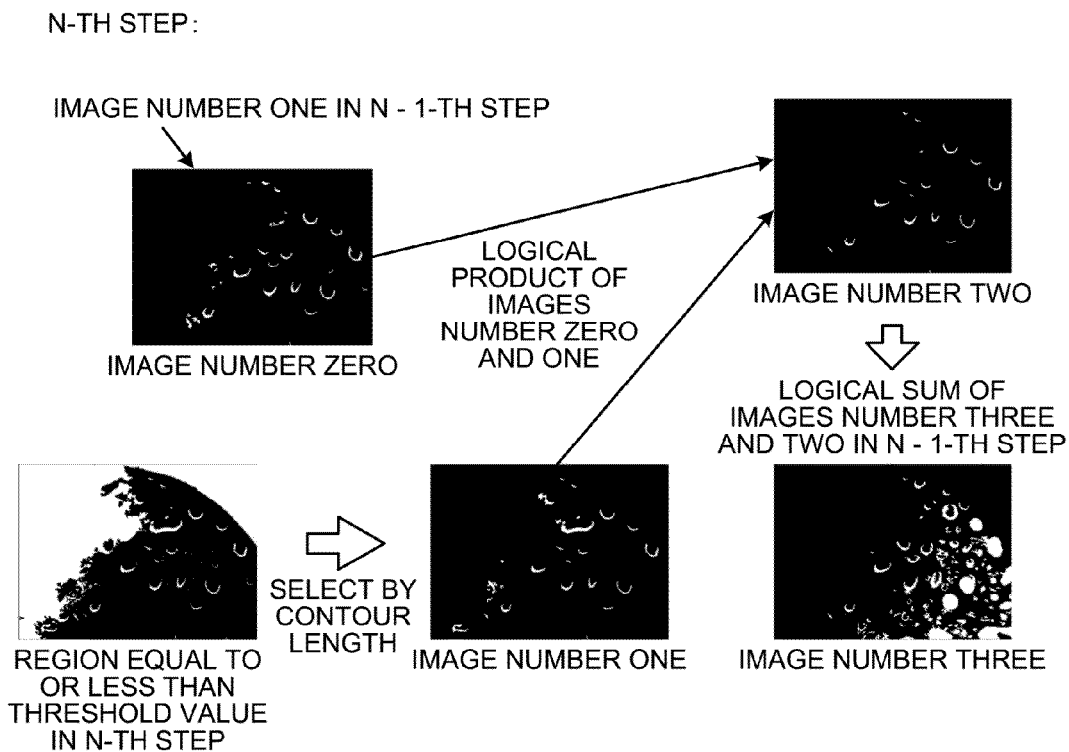
FIG. 6 is a diagram illustrating examples of images in the N-th step in the low intensity region extraction process.
Figure 7:
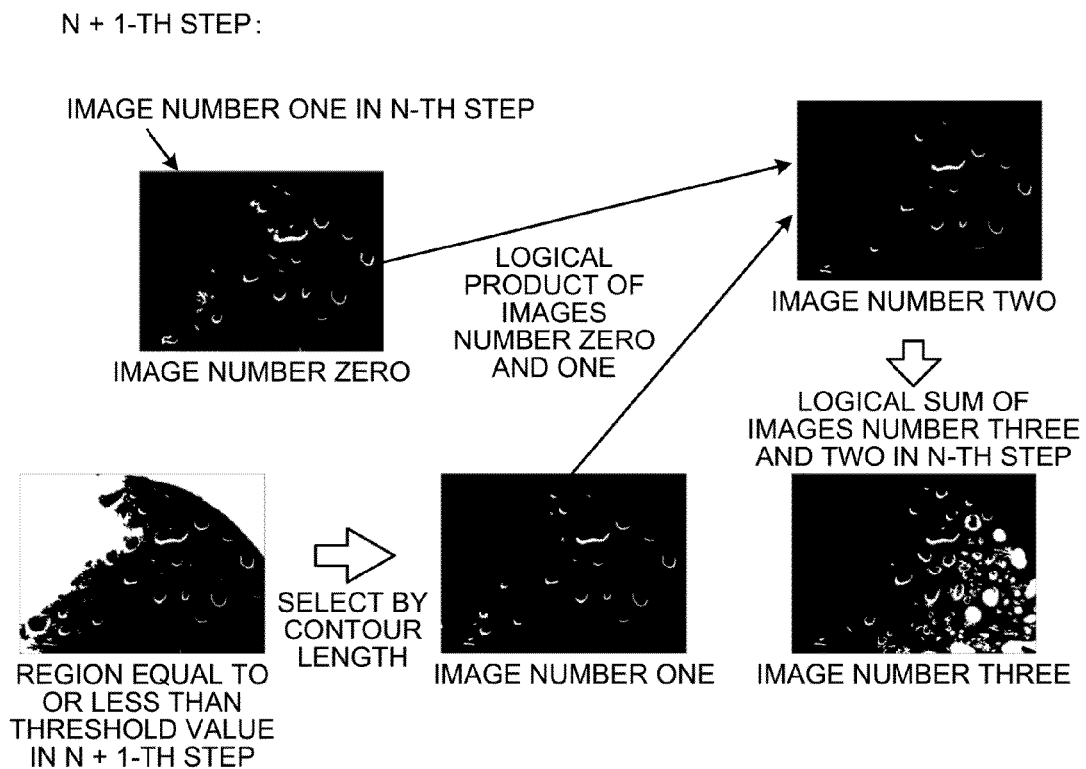
FIG. 7 is a diagram illustrating examples of images in the N+1-th step in the low intensity region extraction process.
Figure 8:
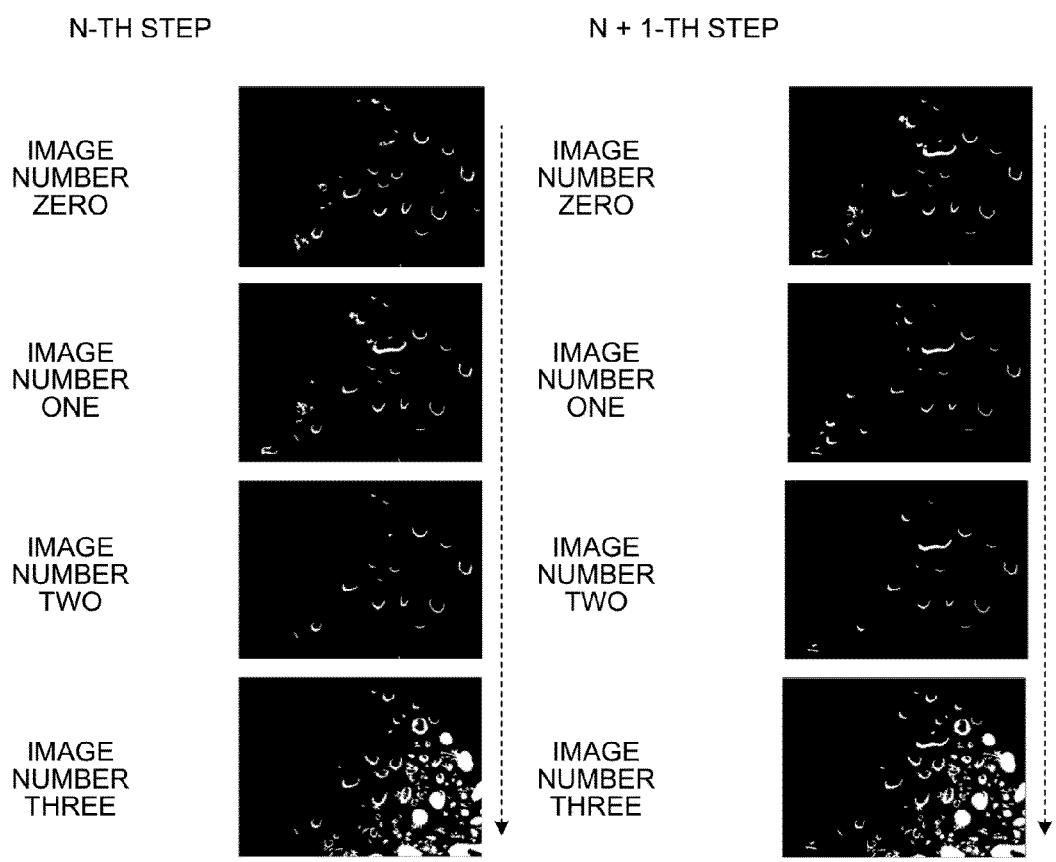
FIG. 8 is a diagram illustrating examples of images of an image number zero, an image number one, an image number two, an image number three in the N-th and N+1-th steps.

Moreover, FIG. 6 is a diagram illustrating examples of images in the N-th step in the low intensity region extraction process. FIG. 7 is a diagram illustrating examples of images in the N+1-th step in the low intensity region extraction process. FIG. 8 is a diagram illustrating examples of images of the image number zero, the image number one, the image number two, the image number three in the N-th and N+1-th steps.

Firstly, the region extraction unit 111 extracts regions with intensity equal to or less than the initial threshold value for low intensity from the image data (step S301). The region extraction unit 111 then extracts the contours of the extracted regions (step S302). Next, the region extraction unit 111 deletes a region with contour length smaller than the low intensity contour length minimum value (step S303), and further deletes a region with contour length larger than the low intensity contour length maximum value (step S304). The region extraction unit 111 then fills in the contours of the resulting remaining regions and draws the regions as a binary image in the image number zero being the predetermined region on the RAM (step S305).

Next, the region extraction unit 111 decreases the threshold value by the threshold value change width for low intensity (step S306). The region extraction unit 111 then judges whether or not the threshold value has become a minimum intensity value or less (step S307).

If the threshold value has become the minimum intensity value or less (step S307: Yes), the region extraction unit 111 extracts regions with intensity equal to or less than the threshold value from the image data (step S308), and extracts the contours of the extracted regions (step S309).

Next, the region extraction unit 111 deletes a region with contour length smaller than the low intensity contour length minimum value (step S310), and further deletes a region with contour length larger than the low intensity contour length maximum value (step S311). The region extraction unit 111 then fills in the contours of the resulting remaining regions and draws the regions as a binary image in the image number one being the predetermined region on the RAM (step S312).

Next, the region extraction unit 111 obtains the logical product of the images of the image number zero and the image number one, and stores the resulting logical product in the image number two being the predetermined region on the RAM (step S313). Next, the region extraction unit 111 obtains the logical product of the image of the image number two and the image of the image number three being the predetermined region on the RAM, and stores the resulting logical product in the image number three (step S314). The region extraction unit 111 then copies the image of the image number one into the image number zero (step S315). Then, the process returns to step S306 and the process up to step S315 is repeated.

In step S307, if the threshold value has not become the minimum intensity value (step S307: No), the process proceeds to step S316. The region extraction unit 111 extracts the image of the image number three as low intensity regions (step S316), and ends the process. Consequently, the low intensity regions are extracted from the image data.

The region extraction unit 111 extracts, from the image data, only the high intensity regions and low intensity regions each having a size that is appropriate to extract in the processes of FIGS. 4 and 5 and accordingly appropriately extracts the high and low intensity regions.

For example, as in the image of "regions with the threshold value or less in the N-th step" illustrated in FIG. 6, even if the left side as a whole is dark, it is set such that low intensity regions can be extracted by excluding one with too large contour length. Moreover, a mere noise-like region is excluded by removing one with too small contour length.

Figure 9:
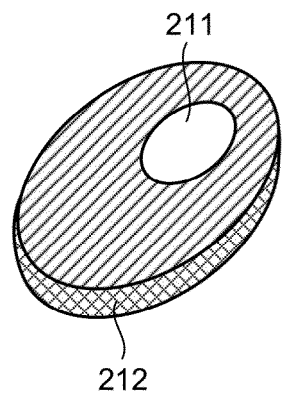
FIG. 9 is a diagram illustrating a high intensity region and a low intensity region.
Figure 10:
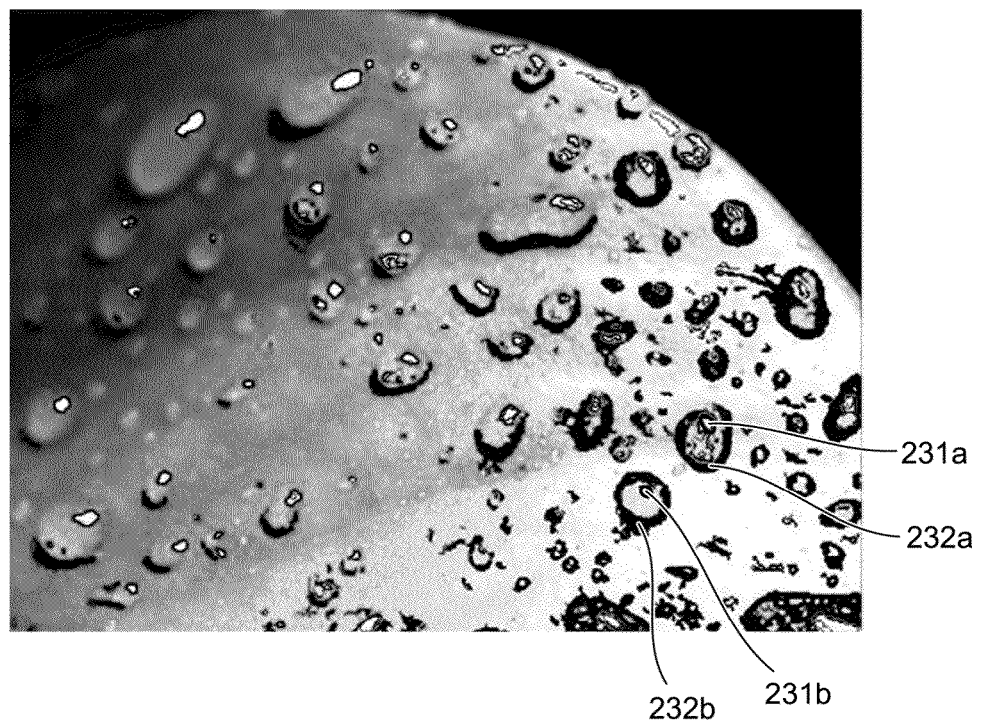
FIG. 10 is a diagram illustrating a region extraction result of the image data illustrated in FIG. 2B.

In the region extraction process, as illustrated in FIG. 9, the highlight portion of the water droplet is extracted as a high intensity region 211, and the shadow portion of the water droplet is extracted as a low intensity region 212. FIG. 10 is a diagram illustrating a region extraction result of the image data illustrated in FIG. 2B. As illustrated, a plurality of high intensity regions 231a, 231b, . . . and a plurality of low intensity regions 232a, 232b, . . . are extracted from the image data.

Returning to FIG. 3, the combination identification unit 112 identifies one combination of a high intensity region and a low intensity region that corresponds to one extraction target region from the high and low intensity regions extracted by the region extraction unit 111 based on positional relationships between the high and low intensity regions (step S102). For example, light is applied from the top right direction of the image in the image data illustrated in FIG. 2B. Accordingly, a predetermined high intensity region, and a low intensity region arranged in a diagonally bottom left direction with respect to the high intensity region is highly likely to be a combination for one extraction target region. The combination identification unit 112 extracts a combination of a high and a low intensity region based on the positional relationship condition. The condition based on which the combination identification unit 112 identifies a combination varies depending on image data being a process target, and is set as appropriate based on the image data. Moreover, the direction in which light is applied may be manually set by the user.

Figure 11:
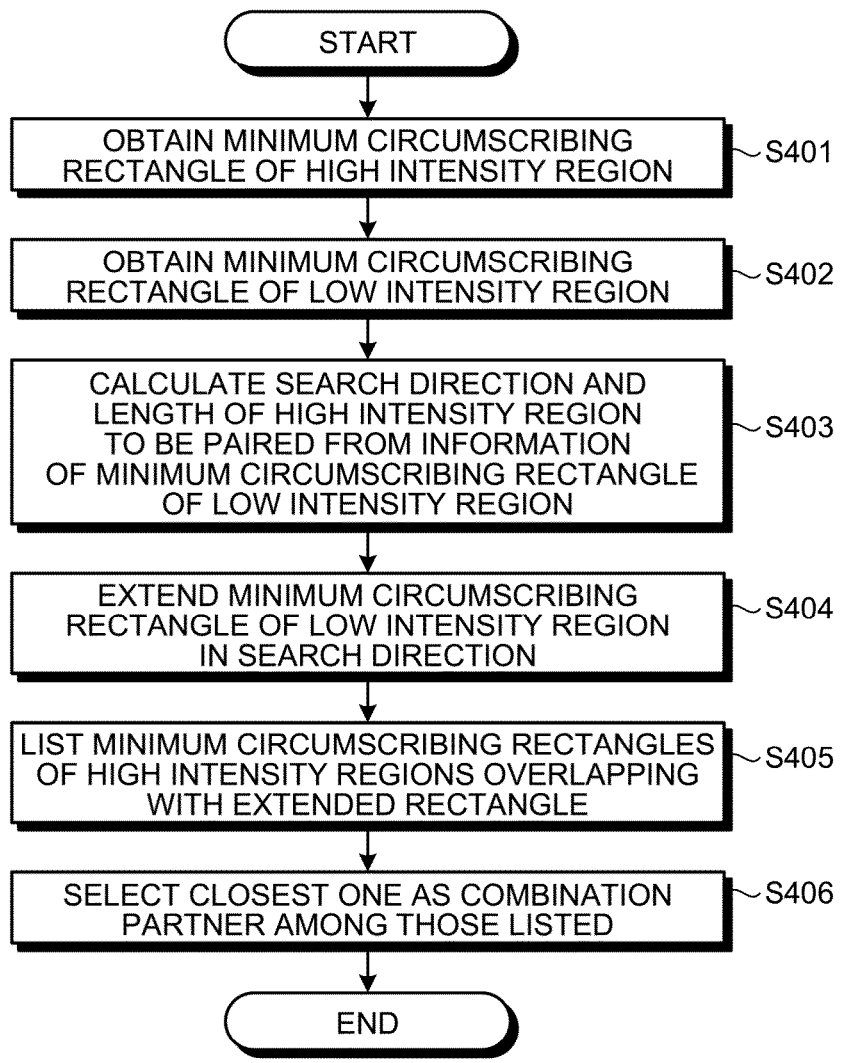
FIG. 11 is a flowchart illustrating a procedure of a combination identification process.
Figure 12:
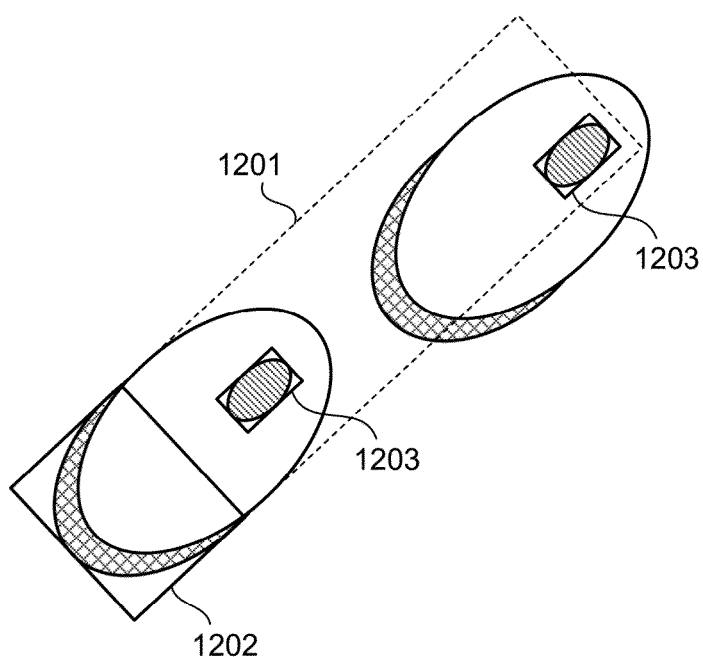
FIG. 12 is a diagram for explaining the combination identification process.

The combination identification process of step S102 will be described here in detail. FIG. 11 is a flowchart illustrating a procedure of the combination identification process. FIG. 12 is a diagram for explaining the combination identification process.

Firstly, the combination identification unit 112 obtains a minimum circumscribing rectangle of the high intensity region extracted from the image data in step S101 (step S401). Next, the combination identification unit 112 obtains a minimum circumscribing rectangle of the low intensity region extracted from the image data in step S101 (step S402).

Next, the combination identification unit 112 calculates a direction and a length in which and by which the search for the high intensity region paired with the low intensity region is performed, from information of a minimum circumscribing rectangle 1202 of the low intensity region obtained in step S402 (step S403).

In the example illustrated in FIG. 12, the search direction is calculated as a short-side direction of the minimum circumscribing rectangle of the low intensity region and an upward direction. This is because it is assumed that the shadow of the water droplet has a crescent shape and that light comes from the relevant direction. The search direction is not limited to this example. Moreover, the length of the extension in the search direction and the search direction may be configured to be set by the user.

Next, the combination identification unit 112 extends the minimum circumscribing rectangle of the low intensity region toward the search direction (step S404). The combination identification unit 112 then lists minimum circumscribing rectangles 1203 of the high intensity regions overlapping with an expanded minimum circumscribing rectangle 1201 of the low intensity region (step S405). Next, the combination identification unit 112 identifies, as a combination partner, the closest minimum circumscribing rectangle among the listed minimum circumscribing rectangles of the high intensity regions (step S405). Consequently, one combination of a high intensity region and a low intensity region that corresponds to one extraction target region is identified.

Figure 13:
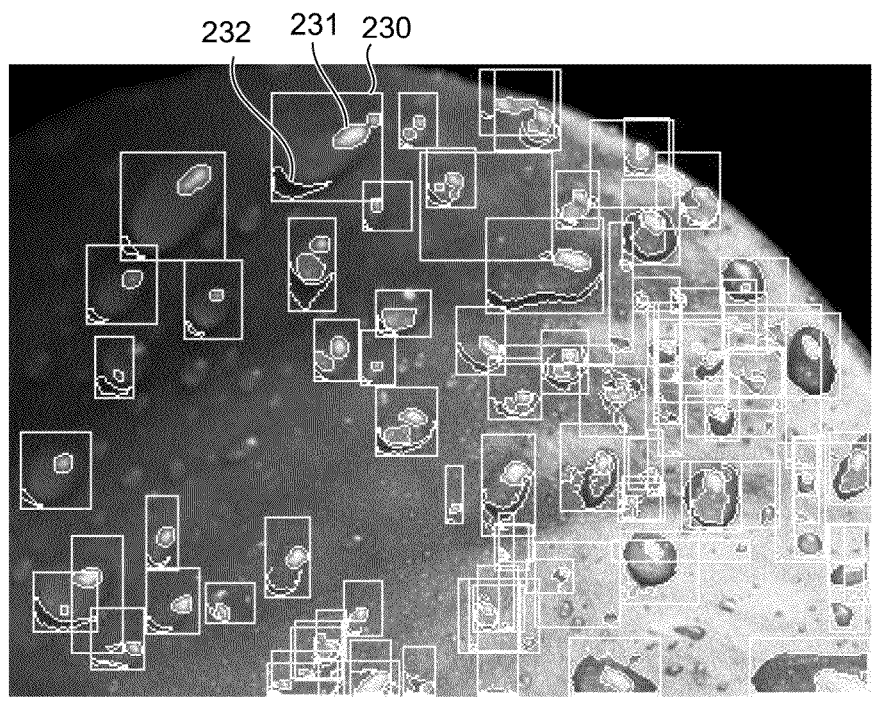
FIG. 13 is a diagram illustrating an outer frame determination result of the image data illustrated in FIG. 2B.

Next, the outer frame determination unit 113 determines outer frames of the combinations identified by the combination identification unit 112 (step S103). FIG. 13 is a diagram illustrating an outer frame determination result of the image data illustrated in FIG. 2B. In FIG. 13, for example, an outer frame 230 has been determined for a combination of a high intensity region 231 and a low intensity region 232. In this manner, the outer frame determination unit 113 determines, as an outer frame, a rectangle including both high and low intensity regions included in a combination, and including a predetermined margin.

Next, the intensity change unit 114 changes the intensity value of the high intensity region in the image data within each outer frame determined by the outer frame determination unit 113, to the intensity value of a pixel of the neighboring region of the high intensity region (step S104). In other words, the intensity change unit 114 performs an inpainting process on the high intensity regions.

Figure 14A:
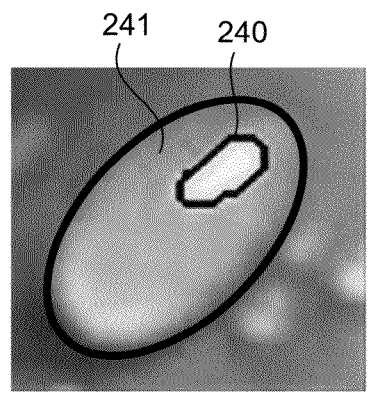
FIG. 14A is a diagram for explaining an intensity change process.
Figure 14B:
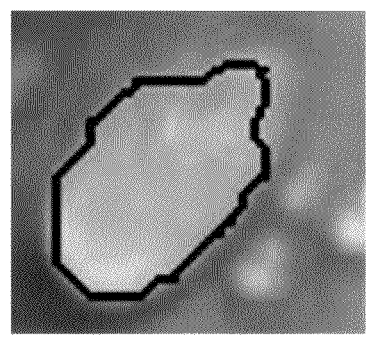
FIG. 14B is a diagram for explaining the intensity change process.

FIGS. 14A and 14B are diagrams for explaining the intensity change process. As illustrated in FIG. 14A, a high intensity region 240 is a part of an extraction target region 241 (a water droplet in the embodiment). In other words, the extraction target region 241 exists around the high intensity region 240. Hence, the inpainting process is performed on the high intensity region 240 and accordingly the intensity value of the extraction target region 241 including the high intensity region 240 can be made have a change amount at the same level as the neighboring region.

The inpainting process by the intensity change unit 114 is performed here using a known method. In other words, in the embodiment, for example, the inpaint( ) function of an image processing library OpenCV of open software is called to realize the inpainting process.

The inpaint( ) function here is to remove a selected image region using pixels in the vicinity of its region boundary and, for example, when a Navier-Stokes based method is selected, performs a process of repeating smoothing while using the values of pixels in the vicinity of the region boundary as a boundary condition and maintaining the continuity of an intensity gradient. The details are described in detail in a technical document "M. Bertalmio, A. L. Bertozzi, G. Sapiro, "Navier-Stokes, Fluid Dynamics, and Image and Video Inpainting", Proceedings of the International Conference on Computer Vision and Pattern Recognition, IEEE, December 2001, Kauai, Hi., volume I, pp. I-355-I362 A. Telea, "An image inpainting technique based on the fast marching method," Journal of Graphics Tools, vol. 9, No. 1, pp. 25-36, 2004."

The intensity change unit 114 then calculates the average intensity of the identified neighboring region. The intensity change unit 114 changes the intensity value of the high intensity region to the calculated average intensity. As another example, the intensity change unit 114 may calculate a standard deviation of the intensity of the neighboring region instead of average intensity, and change the intensity value of the high intensity region based on the value of the calculated standard deviation.

The above process converts the high intensity region 240 illustrated in FIG. 14A into a region continuous with the neighboring region constituting the extraction target region 241 as illustrated in FIG. 14B.

Figure 15A:
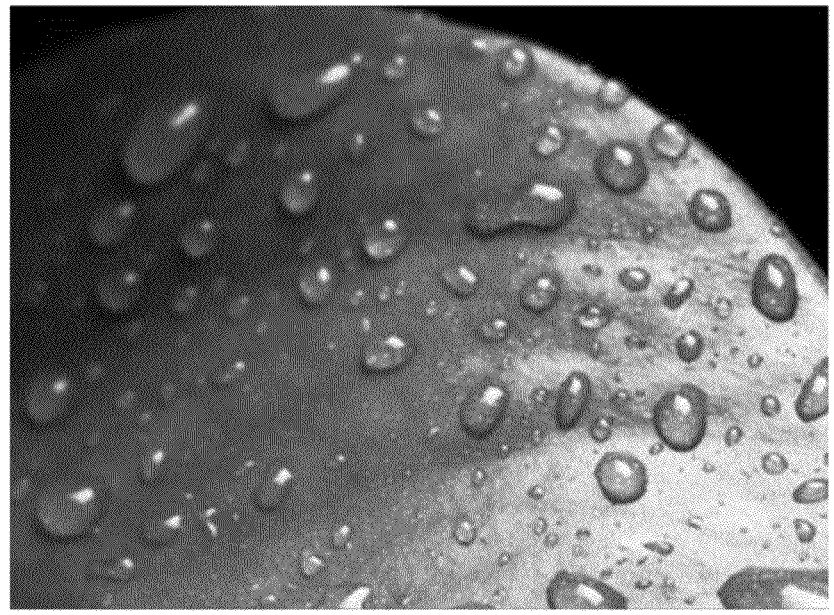
FIG. 15A is a diagram illustrating image data of a process target before the intensity change process.
Figure 15B:
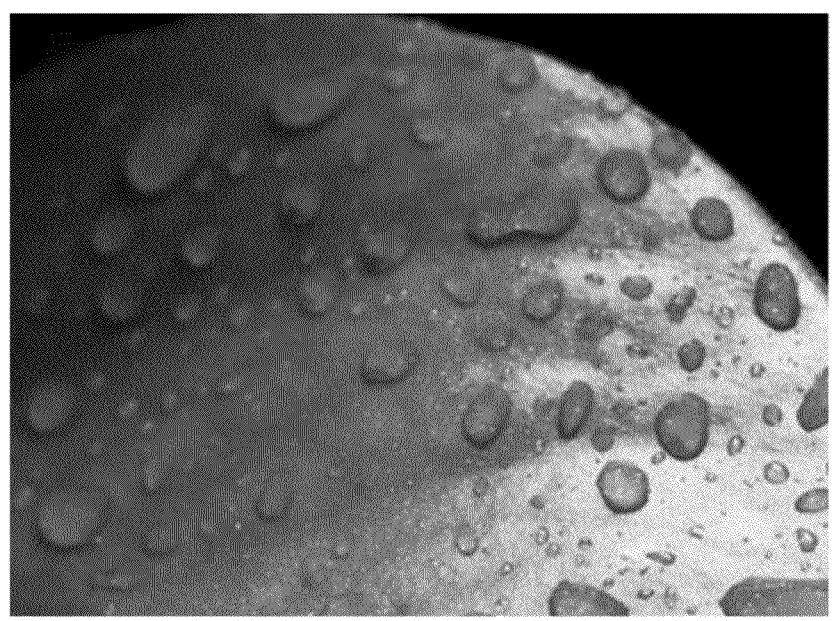
FIG. 15B is a diagram illustrating the image data of the process target after the intensity change process.

FIGS. 15A and 15B are diagrams illustrating image data of a process target before and after the intensity change process. As illustrated, all the high intensity regions are converted by the inpainting process into regions continuous with their neighboring regions, that is, their extraction target regions.

In this manner, a high intensity region where a change in intensity is large is filled with a neighboring color by the inpainting process. Accordingly, a part that is not a contour, such as a highlight portion, can be prevented from being falsely extracted as the contour due to its large intensity change.

Returning to FIG. 3, the contour extraction unit 115 extracts the contours of the extraction target regions after the intensity change (step S105). The extraction result is subsequently displayed on the display unit 102 (step S106), and the process is completed. In step S105, the contour extraction unit 115 performs the graph cuts process on the image data within the outer frames after the intensity change was made to automatically extract the contours.

Figure 16:
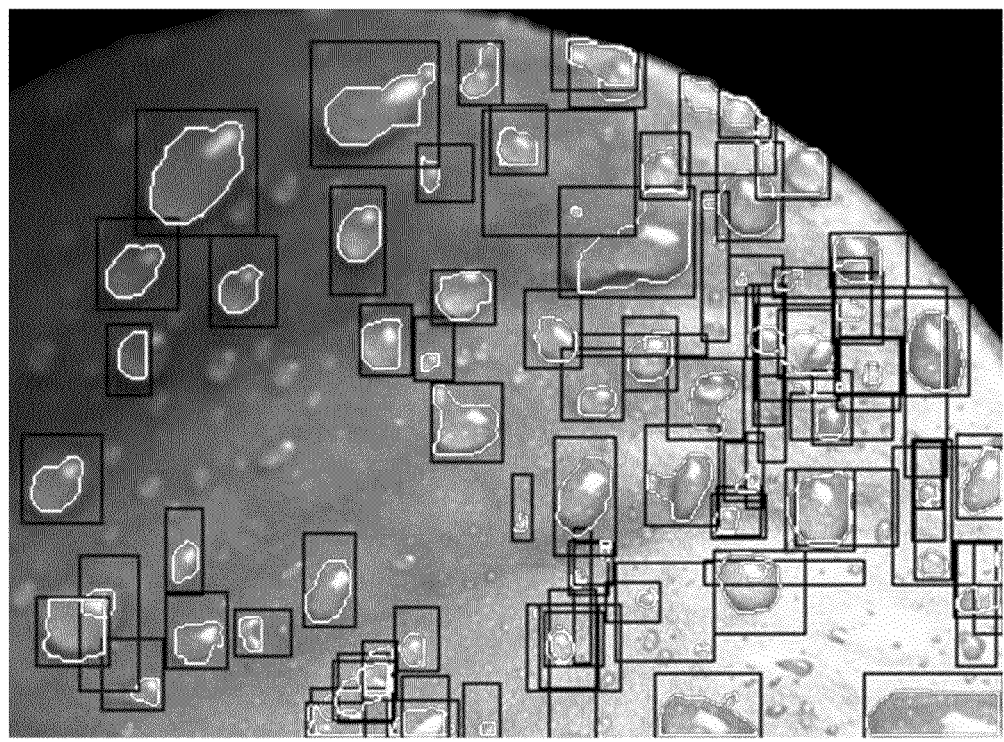
FIG. 16 is a diagram illustrating an example of a contour extraction result displayed on a display unit.

FIG. 16 is a diagram illustrating an example of the contour extraction result displayed on the display unit 102. As illustrated in FIG. 16, the highlight portions (the high intensity regions) are displayed in the displayed image data as in the original image data. However, the image data that is a process target of the contour extraction unit 115 is image data where high intensity regions have been inpainted as illustrated in FIG. 15B.

As described above, if an image that is hard to be extracted automatically, such as a water droplet on a leaf, is set as an extraction target, the image processing apparatus 100 according to the embodiment extracts a high intensity region in the extraction target image and a low intensity region adjacent to the extraction target image and extracts the contour of the extraction target image based on these pieces of information, and accordingly can extract regions accurately.

Furthermore, the image processing apparatus 100 inpaints a region that tends to be falsely judged to be an extraction target region due to a large change in intensity, such as a highlight portion of an image of a water droplet on a leaf, and accordingly can prevent a misjudgment. Furthermore, the image processing apparatus 100 uses image data within an outer frame set based on a high and a low intensity region to perform the graph cuts process and accordingly can extract regions accurately.

In the above description, the description is given taking, as an example, the case where the image processing apparatus 100 sets the water droplet portion as the extraction target. However, the extraction target in the image processing apparatus 100 of the embodiment is not limited to a water droplet. The extraction target in the image processing apparatus 100 of the embodiment can be applied to anything as long as it is a target where an intensity difference between a high and a low intensity region is large and where a positional relationship between the high and the low intensity region can be defined.

The intensity difference between a high and a low intensity region being large indicates that the intensity difference between these regions is equal to or more than a predetermined threshold value. The threshold value is previously set in accordance with an extraction target.

Figure 17:
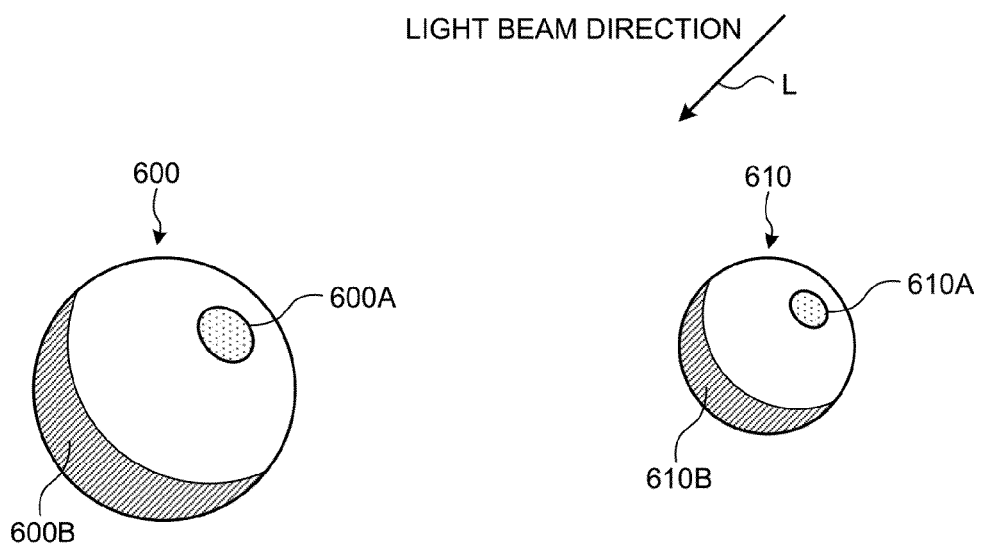
FIG. 17 is a diagram illustrating examples of extraction targets.

For example, as illustrated in FIG. 17, a metal ball 600 and a glass ball 610 are made of materials having high glossiness and accordingly each have large intensity differences between a high intensity region and a low intensity region. FIG. 17 illustrates examples of low intensity regions 600B and 610B and high intensity regions 600A and 610A produced by light from light beam direction L on the metal ball 600 and the glass ball 610. Moreover, a positional relationship between the high and the low intensity region can be defined for the metal ball 600 and the glass ball 610 from their spherical shapes, and accordingly the region extraction can be performed on the metal ball 600 and the glass ball 610 as in the above description, and the present invention can be applied thereto.

Figure 18:
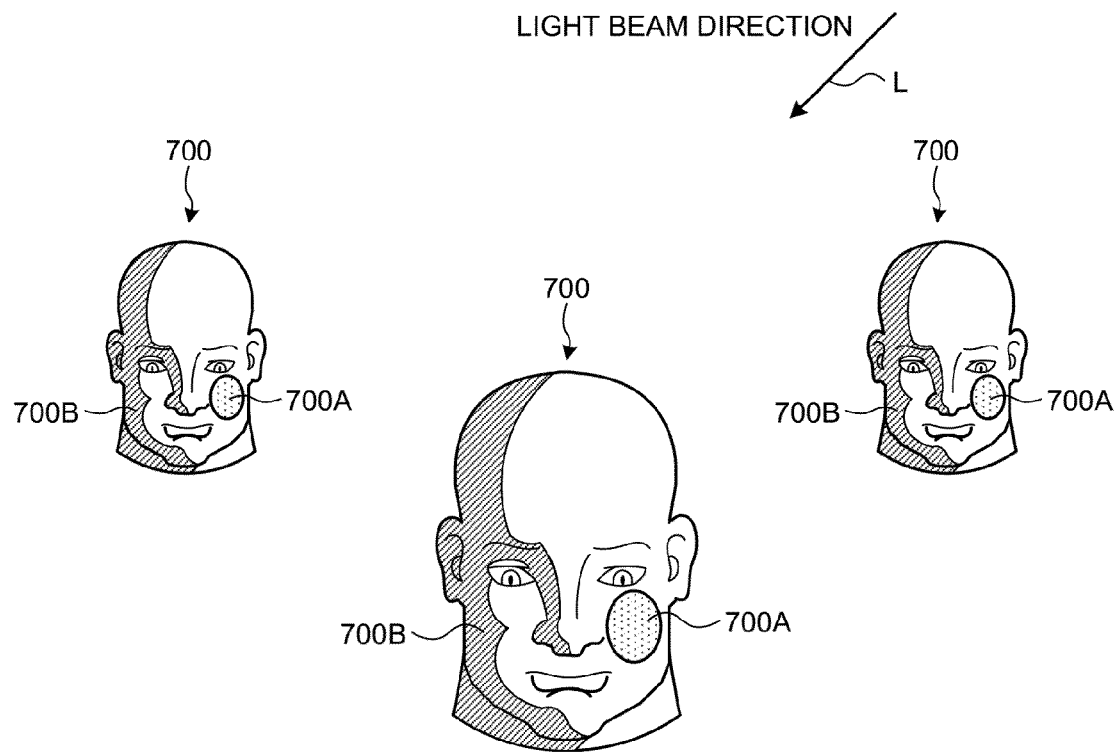
FIG. 18 is a diagram illustrating an example of an extraction target.

Moreover, as another example, as illustrated in FIG. 18, a spherical object such as a human head 700 can be approximated by an ellipsoid and accordingly a positional relationship between a high intensity region 700A and a low intensity region 700B can also be defined. If a light beam (refer to light beam direction L in FIG. 18) is strong, and an intensity difference between the high and the low intensity region is large, then the present invention can be applied thereto, and the region extraction can be performed as in the above description.

Moreover, as long as the extraction target in the image processing apparatus 100 of the embodiment is a target where a positional relationship between a high and a low intensity region can be defined, such as a car, a building, an animal, or a tree, the present invention can be applied thereto, and the region extraction can be performed as in the above description.

Up to this point the embodiment of the present invention has been described. However, various modifications or improvements can be added to the embodiment.

The image processing apparatus 100 of the embodiment includes a control device such as a CPU, a storage device such as a ROM (Read Only Memory) and a RAM, an external storage device such as an HDD and a CD drive device, a display device such as a display device, and an input device such as a keyboard and a mouse, and has a hardware configuration using a normal computer.

A program executed in the image processing apparatus 100 of the embodiment is provided by being recorded in an installable or executable format file in a recording medium that can be read by a computer, such as a CD-ROM, a flexible disk (FD), a CD-R, and a DVD (Digital Versatile Disk).

Moreover, the program executed in the image processing apparatus 100 of the embodiment may be configured to be provided by being stored on a computer connected to a network such as the Internet and downloaded via the network. Moreover, the program executed in the image processing apparatus 100 of the embodiment may be configured to be provided or distributed via a network such as the Internet. Moreover, the program of the embodiment may be configured to be provided by being previously embedded in a ROM and the like.

The program executed in the image processing apparatus 100 of the embodiment has a module configuration including the above-mentioned units (the region extraction unit, the combination identification unit, the outer frame determination unit, the intensity change unit, and the contour extraction unit), and is configured, in terms of actual hardware, such that a CPU (processor) reads the program from the above storage medium and executes the program and accordingly the above units are loaded into a main memory to create the units on the main memory.

In the embodiment, the description is given taking the example where the region extraction apparatus is applied to the image processing apparatus, but instead may be applied to an image forming apparatus such as a multifunction printer having at least two functions of a copy function, a printer function, a scanner function, and a facsimile function, a copier, a printer, a scanner device, and a facsimile apparatus.

The embodiment provides an advantageous effect that a predetermined region in an image can be accurately extracted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A region extraction apparatus that extracts a predetermined region from image data, comprising:
    a processor including a region extraction unit that performs thresholding on intensity values of pixels of image data of a process target, and extracts, from the image data, a high intensity region having higher intensity than a neighboring region thereof and a low intensity region having lower intensity than a neighboring region thereof;
    the processor including a combination identification unit that identifies a combination of a high intensity region and a low intensity region corresponding to an extraction target region to be extracted based on arrangement positions of the high intensity region and the low intensity region extracted by the region extraction unit;
    the processor including an outer frame determination unit that determines an arrangement position and size of an outer frame corresponding to the combination of the high intensity region and the low intensity region based on the arrangement positions and sizes of the high intensity region and the low intensity region of the combination identified by the combination identification unit; and
    the processor including a contour extraction unit that extracts a contour of the extraction target region based on image data within the outer frame determined by the outer frame determination unit.

2. The region extraction apparatus according to claim 1, further comprising:
    an intensity value change unit that changes an intensity value in the high intensity region in the image data within the outer frame to an intensity value in a neighboring region that is adjacent to the high intensity region and in which a change in intensity value is equal to or less than a certain value, wherein
    the contour extraction unit extracts the contour of the extraction target region based on the image data within the outer frame after an intensity value change by the intensity value change unit.

3. A region extraction method of extracting a predetermined region from image data, comprising:
    extracting a region, by a processor, by performing thresholding on intensity values of pixels of image data of a process target, and extracting, from the image data, a high intensity region having higher intensity than a neighboring region thereof and a low intensity region having lower intensity than a neighboring region thereof;
    identifying, by the processor, a combination of a high intensity region and a low intensity region corresponding to an extraction target region to be extracted based on arrangement positions of the high intensity region and low intensity region extracted in the region extraction step;
    determining, by the processor, an arrangement position and size of an outer frame corresponding to the combination of the high intensity region and the low intensity region based on the arrangement positions and sizes of the high intensity region and the low intensity region of the combination identified in the combination identification step; and
    extracting, by the processor, a contour of the extraction target region based on image data within the outer frame determined in the outer frame determination step.

4. A computer program product comprising a non-transitory computer-readable medium having computer-readable program codes embodied in the medium, wherein the program codes when executed cause a computer to function as:
- a region extraction unit that performs thresholding on intensity values of pixels of image data of a process target, and extracts, from the image data, a high intensity region having higher intensity than a neighboring region thereof and a low intensity region having lower intensity than a neighboring region thereof;
- a combination identification unit that identifies a combination of a high intensity region and a low intensity region corresponding to an extraction target region to be extracted based on arrangement positions of the high intensity region and low intensity region extracted by the region extraction unit;
- an outer frame determination unit that determines an arrangement position and size of an outer frame corresponding to the combination of the high intensity region and the low intensity region based on the arrangement positions and sizes of the high intensity region and the low intensity region of the combination identified by the combination identification unit; and
- a contour extraction unit that extracts a contour of the extraction target region based on image data within the outer frame determined by the outer frame determination unit.

* * * * *